(12) United States Patent
Reichow et al.

(10) Patent No.: US 8,256,904 B2
(45) Date of Patent: Sep. 4, 2012

(54) REAR PROJECTED EXPRESSIVE HEAD

(75) Inventors: Mark A. Reichow, Valencia, CA (US); Thomas Frasier LaDuke, Orange, CA (US); Steven T. Kosakura, Tustin, CA (US); R. Christopher Biggs, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 873 days.

(21) Appl. No.: 12/126,796

(22) Filed: May 23, 2008

(65) Prior Publication Data

US 2009/0292614 A1 Nov. 26, 2009

(51) Int. Cl.
*G03B 21/14* (2006.01)

(52) U.S. Cl. .............. 353/119; 353/28; 353/30; 353/47; 353/122; 352/86; 352/10

(58) Field of Classification Search .................... 353/28, 353/30, 47, 119, 122, 85; 352/86, 10, 28, 352/43, 47, 48, 52, 54, 85, 87, 89; 446/175, 446/138, 303, 342, 353, 348, 301, 299, 298, 446/297, 300, 343, 344; 345/156, 173
See application file for complete search history.

(56) References Cited

U.S. PATENT DOCUMENTS

| | | | |
|---|---|---|---|
| 1,653,180 A | | 12/1927 | Jalbert |
| 3,973,840 A | | 8/1976 | Jacobs et al. |
| 4,775,352 A | * | 10/1988 | Curran et al. .................. 446/301 |
| 4,978,216 A | | 12/1990 | Liljegren et al. |
| 5,221,937 A | * | 6/1993 | Machtig ........................... 353/28 |
| 5,940,167 A | * | 8/1999 | Gans ................................ 352/43 |
| 6,050,826 A | * | 4/2000 | Christianson et al. ......... 434/262 |
| 6,193,580 B1 | * | 2/2001 | Albert et al. ................... 446/297 |
| 6,467,908 B1 | * | 10/2002 | Mines et al. ..................... 353/28 |
| 6,817,716 B1 | * | 11/2004 | Hines ............................... 353/10 |
| 7,118,228 B2 | * | 10/2006 | May ................................ 353/99 |
| 2002/0015037 A1 | * | 2/2002 | Moore et al. .................. 345/419 |
| 2002/0022212 A1 | * | 2/2002 | Christianson et al. ......... 434/262 |
| 2005/0094103 A1 | * | 5/2005 | Robinson et al. ............... 353/10 |
| 2006/0279709 A1 | * | 12/2006 | Yamamoto ...................... 353/85 |
| 2006/0287114 A1 | * | 12/2006 | Luong ............................. 463/51 |

OTHER PUBLICATIONS

T. Yotsukura, et al. "Hyper mask—projecting a talking head onto a real object," The Visual Computer (2002); 10 pages.

* cited by examiner

*Primary Examiner* — Georgia Y Epps
*Assistant Examiner* — Sultan Chowdhury
(74) *Attorney, Agent, or Firm* — Samuel K. Simpson; Patent Ingenuity, P.C.

(57) ABSTRACT

The subject matter disclosed herein relates to systems and methods for providing image projection and entertainment.

9 Claims, 4 Drawing Sheets

REAR PROJECTED EXPRESSIVE HEAD

BACKGROUND

1. Field

The subject matter disclosed herein relates to systems and methods for image projection and entertainment.

2. Information

Technical difficulties related to using image projection for creating an illusion of animated facial expression of a face of a living person onto a head of a mannequin include, among other things, maintaining alignment, registration and focus of the image onto a face-shaped contoured projection screen. The technical difficulties become further pronounced where movement of the head is desired. Therefore, freedom of movement of such a figure may be restricted and the range of physical expression and realism conveyed by the figure is correspondingly limited.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Projection systems are disclosed having a rear projection screen and a compact projector. In particular embodiments, an image may be projected onto the back of the rear projection screen to entertain and/or entice a customer to make a transaction. In other embodiments, projection systems further include touch sensitive elements such that a patron may interact with the projection system and/or affect a transaction.

In particular embodiments, projection systems are disclosed having a contoured rear projection screen in the form of a face of a head-shaped figure and a compact projector coupled to the head-shaped figure. An image may be projected onto the back of the face to animate the facial expression of the face. The projector being integrally coupled to the head-shaped figure by a platform so as to ensure that the image always remains in proper focus, alignment, and registration on the face despite free and unrestricted movement of the head by a motion device without the need for alignment, tracking, and/or feedback built into the projection system. By using proper lighting and sound effects, a wig and clothing, and other special effects, a "talking head" with a lifelike appearance may be created.

Figure 1C:
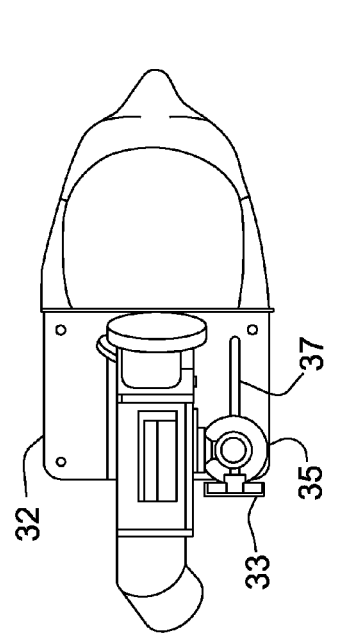
FIGS. 1A, 1B, and 1C are side, back and top views, respectively of a projection system according to an embodiment.
Figure 1A:
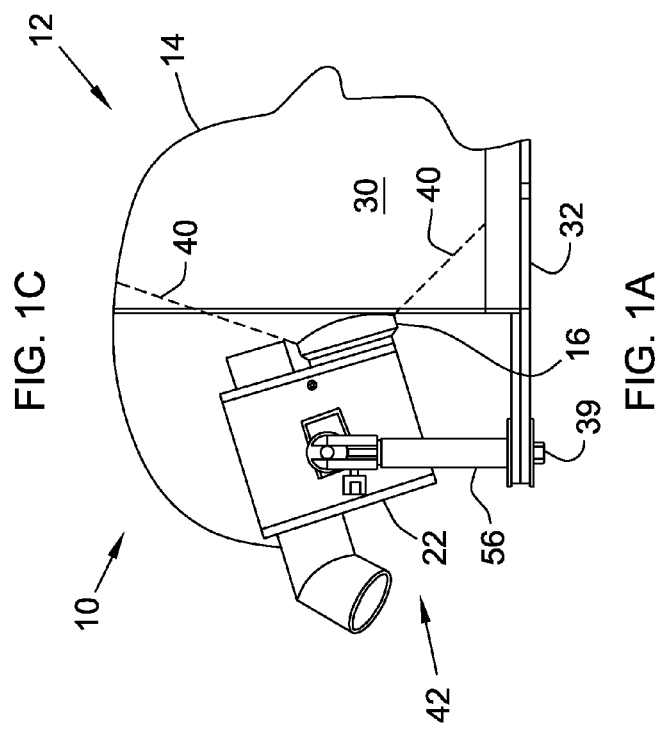
Figure 1B:
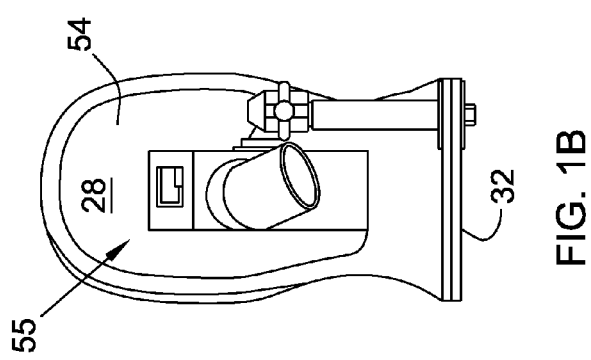

FIGS. 1A, 1B and 1C are side, back and top views, respectively, of projection system 10 comprising head-shaped FIG. 12, LED projector 22, and lens 16, in accordance with a particular embodiment. Head-shaped FIG. 12 includes face 14 with features resembling those of a human. As shown in the drawings, head-shaped FIG. 12 may be of the type that may be used in an amusement or theme park or other selected environment to entertain and amuse patrons. Face 14 comprises face front surface 30 and face back surface 28 defining cavity 55.

In accordance with an embodiment, the physical contour of face back surface 28 of face 14 may be adapted to conform to the general shape of an actor whose face is filmed intended for projection onto face 14. Using the same actor for both the model for the life mask of the face 14 and for recording the image to be projected onto face back surface 28 of face 14, assists in the alignment, registration, and focus of the image onto face back surface 28. Major facial features, such as eyes, nose, and chin of the projected image will have, generally, a direct correspondence to eyes, nose, and chin, respectively, of face back surface 28.

Although a human head has been illustrated and described, it is understood that the features of the present embodiments are applicable to different types of figures as well. For example, such a figure could alternatively represent an animal, cartoon character or other fictional character. Different parts of the body besides the head also may be depicted.

LED projector 22 and lens 16 are mounted inside head-shaped FIG. 12 about cavity 55 and are adapted to project an image into cavity 55 and directly onto face back surface 28 without the use of additional mirrors so as to animate the facial expressions of face 14. Lens 16 projects the image onto face back surface 28 of face 14. The transparency of face 14 provides that the projected image may be seen from the face front surface 30 of face 14.

The LED projector 22 includes an illuminating source comprising one or more light emitting diodes (LED). Light emitting diodes are well known in the art. Light emitting diodes may be particularly insensitive to vibration-induced damage, have long lifetime, and produce relatively little heat, as compared with incandescent or high intensity discharge lamps. As such, the LED light source allows for placement of the LED projector in close proximity to the face front surface 30 in the relatively enclosed conditions of cavity 42 of head-shaped FIG. 12.

In accordance with particular embodiments, head-shaped FIG. 12 and LED projector 22 are supported by platform 32. In accordance with an embodiment, platform 32 may be adapted to be coupled to a motion device (not shown) adapted to move head-shaped FIG. 12 in different directions in a controlled fashion. Since the normal human head may be capable of pivoting in all directions relative to the rest of the body, the motion device likewise may be adapted to pivot the platform 32 and thus head-shaped FIG. 12 and LED projector 22 in all directions. Such movement of head-shaped FIG. 12 may be controlled by a computer program in conjunction with various pneumatic and/or hydraulic systems (not shown) presently in use today on figures in theme parks. If head-shaped FIG. 12 forms part of a larger figure or body (also not shown), the motion device can be concealed inside the neck or chest area of the body. Alternatively, the motion device can be connected to some other structure if only head-shaped FIG. 12 is displayed.

Lens 16 may comprise a wide angle "fisheye" lens having a very short focal length, for example, 8 mm. In a prototype constructed in accordance with a particular embodiment, a Nikon FC-E8 Fish-Eye Converter lens of Japan having 183 degree coverage has been tested and found to be satisfactory. Other lenses may be used so long as the projection angle of the lens, indicated by the dotted lines 40 in FIG. 1A, may be wide enough to substantially cover face 14. In one embodiment, the focal length of lens 16 may be selected based, at least in part, upon the size of head-shaped FIG. 12, an available distance between lens 16 and face 14, and an amount of surface area to be covered by the projected image. Use of lens 16 with a short focal length may import reduced distortion particularly if disposed in limited space, for example.

Head-shaped FIG. 12 in particular embodiments may be hollow and has a continuous opening 42 at the back and lower portion of face 14 for receiving the LED projector 22 and associated cabling (not shown).

Face 14 may be molded from a translucent moldable material, such as plastic. In accordance with an embodiment, face 14 comprises vacuformable material. In accordance with a method for making face 14, a live actor may be chosen with the facial characteristics desired for face 14. A life mask may be made of the actor's face to create the detail and geometry of face 14. From the life mask, a vacuform hard tool may be made. Using this hard tool, a suitable material may be used to create face 14.

Suitable materials include, but are not limited to, acrylic, butyrate, and PETG (glycol-modified polyethylene terephthalate) which is a copolyester that may be a clear amorphous thermoplastic. PETG sheet has material properties of high stiffness, hardness, and toughness as well as good impact strength. PETG may be heated and pulled into the shape of face 14 using a draw box technique to gain the depth required. This method ensures a more even thickness of PETG over the entire face 14. The thickness of PETG selected may be dependent on the particular purpose. Thinner sheets of PETG, on the order of 0.062 inches, may provide a better display of a projected image due to the reduced internal reflection within the PETG sheet that can result in a less focused image. On the other hand, for example, a PETG sheet thickness of 0.125 inches may provide improved mechanical strength. Such mechanical strength may ensure that face 14 may be robust enough to withstand typical animatronic motion, shock, vibration, and possible mishaps from maintenance staff.

In accordance with an embodiment, the PETG sheet may be pulled to form face 14 using the life mask. Face front surface 30 may be modified to create a surface that prevents ambient light from reflecting off face 14, as PETG sheet may be smooth and relatively reflective. In an embodiment for modifying face front surface 30, face front surface 30 may be exposed to an abrasive and etching treatment comprising exposing face front surface 30 to a pneumatic micro blast of 50 micron sodium bicarbonate to create a frosted surface. Certain areas of face 14 may be protected from the abrasive treatment to prevent those areas from becoming frosted. The abrasive treatment may create a surface that prevents ambient light from reflecting off the surface and spoiling the illusion. The eyes may be left shinny to create a wet look that real eyes possess if light hits them. This abrasive treatment may take the place of previous inferior methods that collect dust and degrade from cleaning.

Face back surface 30 of face 14 may be coated with a rear projection screen material 54 to permit visualization of the image projected by LED projector 22. In accordance with an embodiment, rear projection screen material 54 comprises a low gain matte neutral gray coating. It also is appreciated that other types of materials may be used. In general, whatever material may be used, it should be able to project the image yet block the components inside head-shaped FIG. 12 from view. It also should not add color to the image where that would be undesirable.

Proper alignment, registration, and focus of the projected image onto face back surface 30 of face 14 are, at least in part, factors in achieving a convincing illusion of animated facial expression of face 14. Further, movement of projection system 10 so as to accommodate head movements should not impart unacceptable vibration that would tend to disturb proper alignment, registration, and focus of the projected image onto the face back surface 30.

Referring again to FIGS. 1A-1C, face 14 and LED projector 22 are coupled to platform 32. Platform 32 provides a rigid support such that once the face 14 and LED projector 22 are arranged so as to provide proper alignment, registration, and focus of the projected image onto the face back surface 30, the face 14 and LED projector 22 may be fixed to platform 32. Movement of the head-shaped FIG. 12 may then be accommodated by movement of platform 32 without changing the relative positioning of face 14 and LED projector 22 ensuring the maintenance of proper alignment, registration, and focus of the projected image onto the face back surface 30 of face 14.

In particular embodiments, a mount may be provided for coupling with the LED projector 22 to assist in alignment and registration of LED projector 22 to face back surface 30. In the embodiment of FIGS. 1A-1C, LED projector 22 may be coupled to an alt-azimuth mount 56 which may be coupled for sliding engagement with platform 32 about elongated slot 37. This mounting arrangement allows for lateral, horizontal and vertical adjustments of the LED projector 22 so as to position lens 16 with respect to face 14. The lateral and vertical adjustments of LED projector 22 via adjustment bolts 33 and 35 enable proper registration of the image on face 14 while the horizontal adjustment of LED projector 22 via adjustment bolt 39 passing through elongated slot 37 enables proper sizing of the image on face 14. Further fine adjustment means on lens 16 (not shown) allow proper focusing of the image onto face 14.

Figure 2:
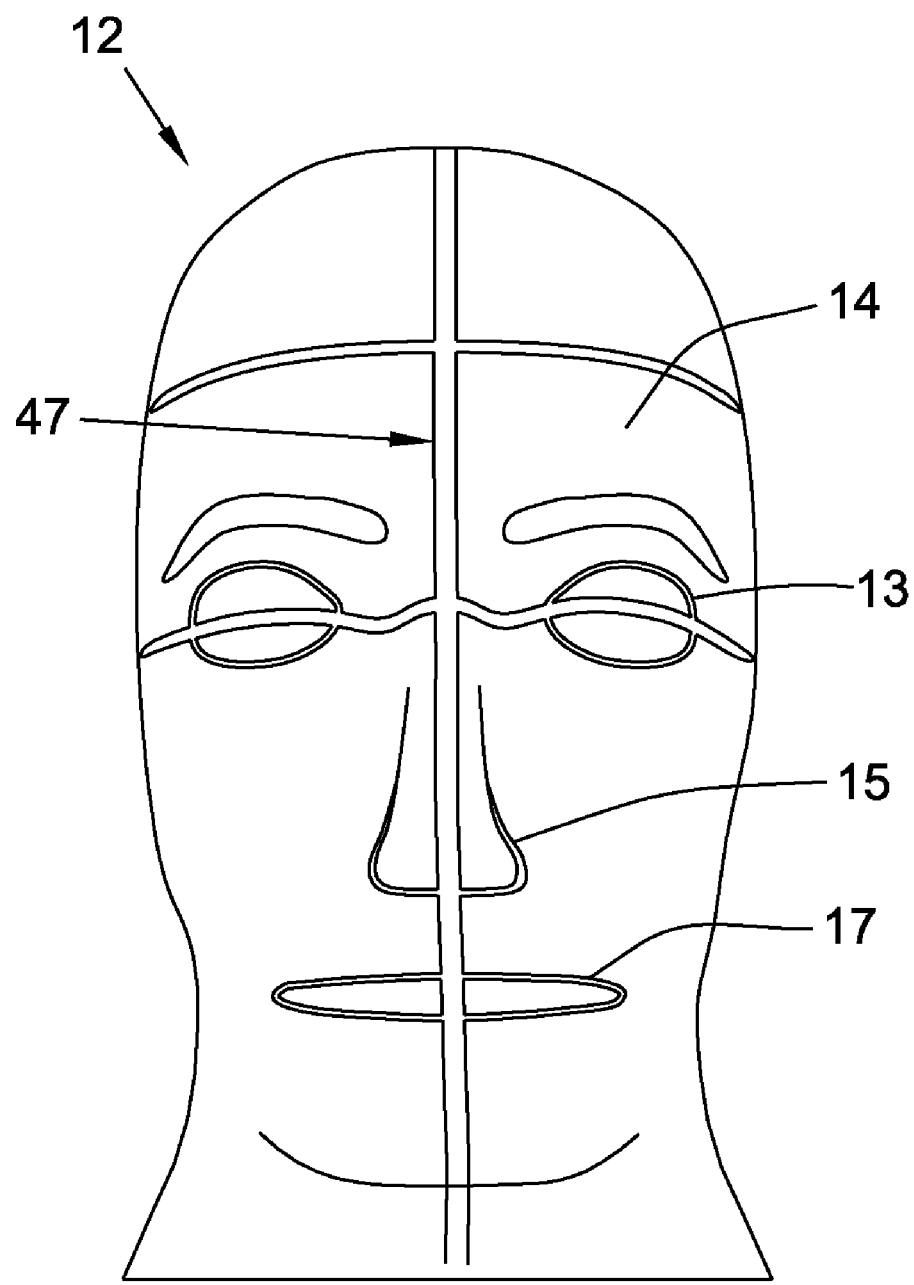
FIG. 2 shows rear projection screen in the form of a face exposed to a calibration image projection, in accordance with an embodiment.

FIG. 2 shows face 14 exposed to calibration image projection 47 comprising a pattern of projected lines. A calibration process may be performed as a part of installation of LED projector 22 onto platform 32, in accordance with an embodiment. A pattern of projection lines may be used to center and balance the image vertically and horizontally in optimal alignment with eyes 13, nose 15 and mouth 17.

In an embodiment, the actor's face that may be used to model the life mask may be filmed and the resulting image may be processed to properly project on the face back surface 28. This may produce an image that closely maps to the face back surface 28, since geometry and proportions of the human face (nose, mouth, eyes) vary from one person to the next. Projecting the image of one person's face into the shape of another's can look very odd and create a distracting look to an illusion.

It also is noted that the resulting image may be moving or still, depending on the effect desired to be achieved.

The use of LED projector 22 may be advantageous for a number of reasons as compared with projectors having conventional projector lamps, such as gas vapor and incandescent lamps. LED projectors use light emitting diodes (LEDs) as the light source which are shock resistant, produce little heat, and have a long life. Conventional projector lamps are subject to vibration and shock induced filament breakage, high heat output, and high maintenance due to short life of common lamps. An example of a suitable LED projector may be the Mitsubishi PK-20 LED DLP projector.

Because LED projector 22 may be mounted to the same platform 32 as head-shaped FIG. 12 there may be no requirement for real time tracking of the projector image onto face 14. In accordance with an embodiment, an initial alignment may be done when LED projector 22 is installed onto platform 32. The alignment of LED projector 22 may be optimized by projecting an image of a face onto face back surface 28. LED projector 22 may be moved until projected eyes, mouth and nose are aligned with eyes, mouth, and nose of face 14. Once the alignment process is done, LED projector 22 position may be locked down.

The structural features of the present embodiments of projection system 10 provide significant advantages in the technique of rear projection of images onto head-shaped FIG. 12. The LED projector 22 coupled to the same platform 32 as face 14 for direct projection of an image without the use of additional mirrors within head-shaped FIG. 12 enables free and unrestricted movement of head-shaped FIG. 12. This movement of head-shaped FIG. 12 may comprise twisting and turning, nodding and other movements to simulate realistic, lifelike movements and expressions similar to those of a natural human head. All of this may occur without unfocusing or loss of registration of the image.

Moreover, because the LED projector 22 can be made small, has relatively little heat output, not prone to failure due to vibration, and if lens 16 has an extremely short focal length, all of the components comprising the optical image projection may fit inside head-shaped FIG. 12, or at least coupled to the same platform 32 supporting head-shaped FIG. 12, where they may be concealed from view by a wig, clothing or other costumes to present the most realistic figure possible. The associated cabling may be bundled and may exit the installation from a preferential location. Furthermore, by coupling everything inside head-shaped FIG. 12, a clear, focused and registered image may be projected onto face 14, despite movement of the head in different directions.

Particular embodiments of projection system 10 are especially versatile because it can be costumed or dressed up without concern for obstructing any light beams from an external image source. Thus, the use of fog and smoke may be freely used to enhance the visual effect of the figure. Similarly, props such as hair, glasses or clothing will not obstruct the path of the projected image or convey any unwanted shadows. If proper sealing precautions are taken, it is contemplated that the figure could be displayed in the rain, or even submersed in water so that it could pop up and startle an unsuspecting guest.

In particular embodiments, the projected image may be a video comprising a face of a real person, or of an animated figure, to animate the facial expression of the head-shaped FIG. 12. In embodiments, the recorded image may simply be provided to the projector with minimal processing of the image data. In other embodiments, the image data may be manipulated and processed for a particular purpose. For example, the image data may be processed so as to produce selective stretching or compressing of the image so as to provide more accurate registration and/or focus of the image to better conform to the contour of the face back surface 28.

In accordance with an embodiment of a method, an actor's face may be filmed using three cameras. A first camera may be located in front of the face so as to film the front of the face. A second camera may be located at a particular angle, such as, but not limit to, 60 degrees, to the right of the face so as to film an oblique view of the right side of the face. A third camera may be located at a particular angle, such as, but not limit to, 60 degrees, to the left of the face so as to film an oblique view of the left side of the face.

The three cameras may be slaved; that is, all three cameras may use a time code from one of the cameras so as to synchronize for time. A dimensional tracking device may be filmed by all three cameras simultaneously for parallax determination, compensation, or setting. The face may be illuminated with the same lighting conditions as will be used in an installation, such as in an attraction, for example, but not limited thereto.

The resulting motion picture image may be aligned, stabilized, and merged together using image processing software, such as, but not limited to, Adobe® After Effects® CS3. A warp mesh may be created that may be used to distort the image so as to conform to the shape and size of the face back surface. The image is further processed using the warp mesh for alignment of major features of the face, such as, but not limited to, the eyes, nose, and mouth.

In accordance with an embodiment of a method, computer generated graphics may be used to create an image for projection. In yet other embodiments, live action and computer generated images may be combined or used sequentially, such as to morph a live action image into a computer generated image for example, but not limited thereto.

Figure 3:
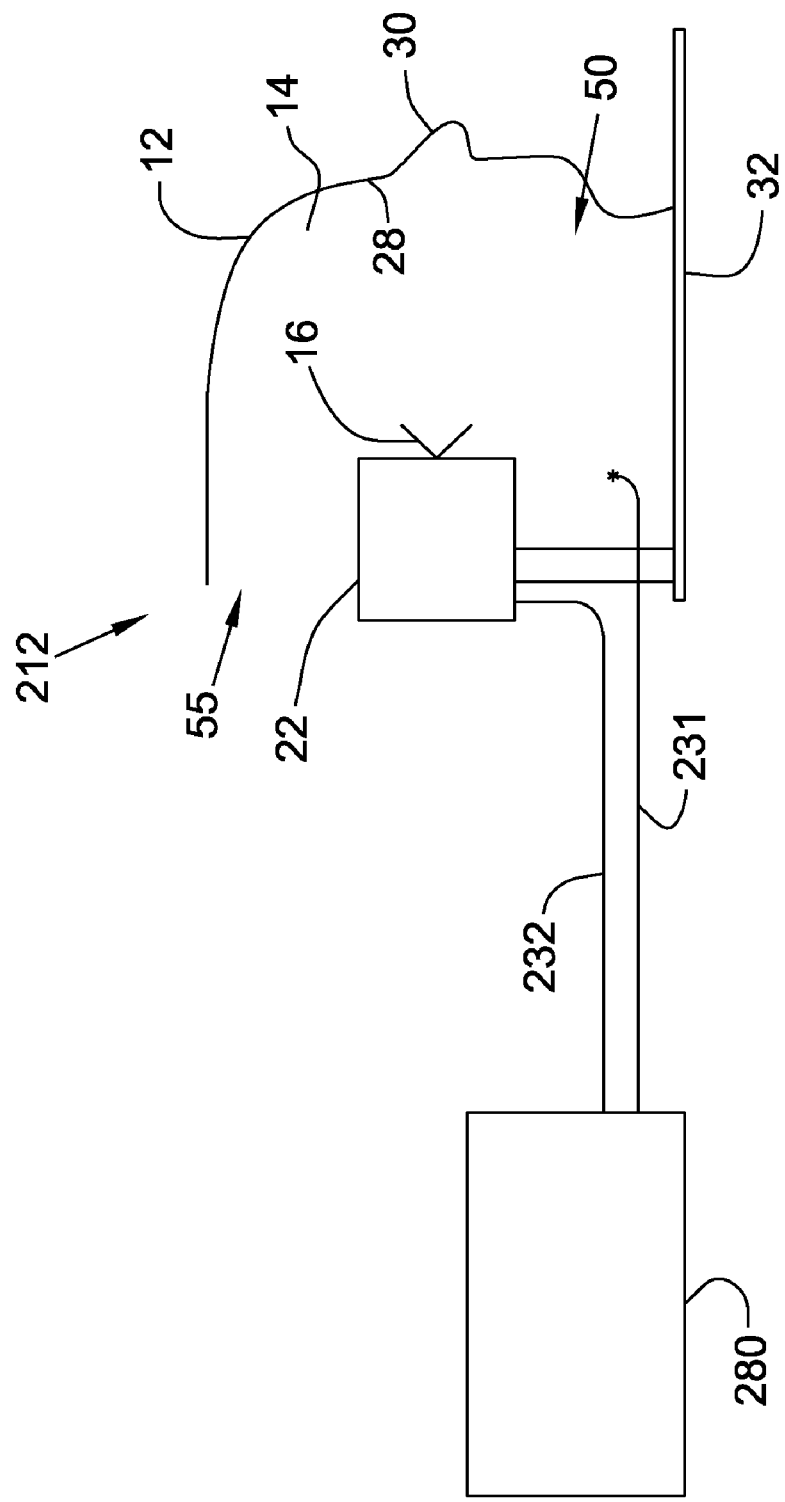
FIG. 3 is a side view of projection system comprising head, LED projector, and media control, in accordance with a particular embodiment.

FIG. 3 is a side view of projection system 212 comprising head-shaped FIG. 12, LED projector 22, and lens 16, and media controller 280, in accordance with a particular embodiment. Head-shaped FIG. 12 includes face 14 with features resembling those of a human. Face 14 comprises face front surface 30 and face back surface 28 defining cavity 55. LED projector 22 and lens 16 are mounted inside head-shaped FIG. 12 about cavity 55 and are adapted to project an image into cavity 55 and onto face back surface 28 to animate the facial expressions of face 14. The transparency of face 14 provides that the projected image may be seen from the face front surface 30 of face 14.

In accordance with particular embodiments, head-shaped FIG. 12 and LED projector 22 are supported by platform 32.

Media controller 280 may be operable to control media supplied to the LED projector 22 via media cable 232 and therefore projection of a particular image. Media controller 280 provides a video signal suitable for use by LED projector 22 to produce the image for projection onto face 14. Suitable video signals include, but are not limited to, VGA, component, and composite. The video media may be prerecorded content or live.

In other embodiments, media controller 280 may supply particular media from a plurality of stored media maintained in any one of several encoded formats such as, but not limited to, MPEG, AVI, QuickTime, or DivX. In yet other embodiments, media controller 280 may supply particular media from a plurality of stored media based on an input, such as, but not limited to, a signal from a motion sensor or touch sensor.

In accordance with other embodiments, face outer surface 30 further comprises touch sensitive conductive layer 50. The touch sensitive conductive layer 50 may be operable to produce a signal based on a change in an electrical state that may occur if touched. Touch sensitive conductive layer 50 may be coupled in electrical communication with media controller 280 by touch cable 231. Media controller 280 may be adapted to control projection of a particular image based on an electrical state of touch sensitive conductive layer 50. In accordance with an embodiment, by way of example, if face 14 is touched, touch sensitive conductive layer 50 sends a signal to the media controller 280 and a particular image may be projected on face 14. In this way, face 14 may be interactive with the participant who touches it.

In accordance with an embodiment, touch sensitive conductive layer 50 comprises indium tin oxide (ITO). Indium tin oxide is electrically conductive, substantially optically transparent to the visible spectrum, and colorless in thin layers.

Projection system 212 allows for a dynamic and interactive experience that may contribute to the realism of the installation.

Figure 4A:
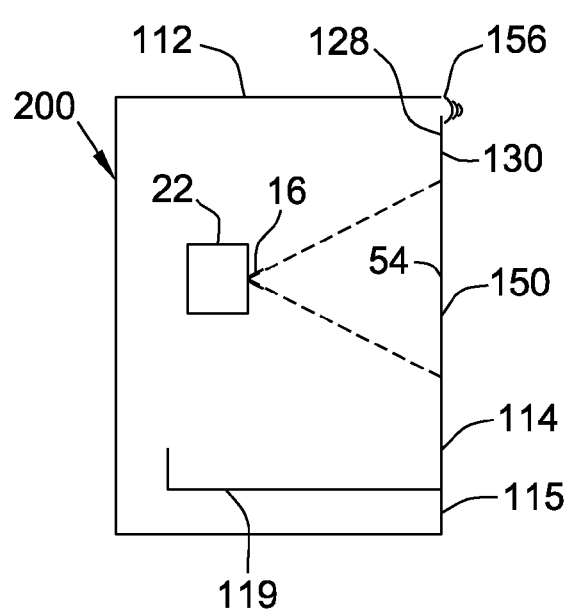
FIGS. 4A and 4B are side and front views, respectively, of projection system comprising display panel, LED projector, lens, contained in housing, in accordance with a particular embodiment.
Figure 4B:
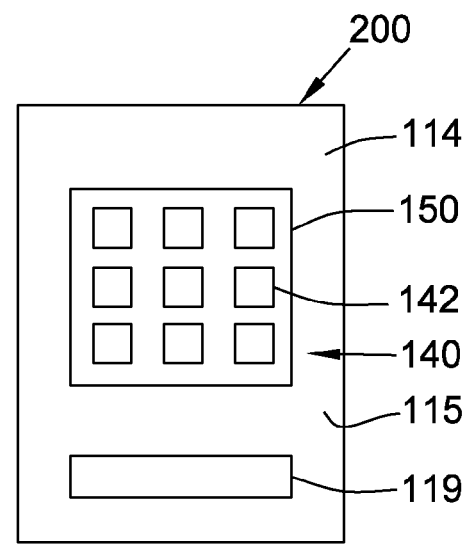

FIGS. 4A and 4B are side and front views, respectively, of vending machine 200 comprising housing 112, display panel 114, LED projector 22, and lens 16, in accordance with a particular embodiment. Housing 112 comprises housing front side 115 onto which display panel 114 may be coupled. In the particular embodiment of FIGS. 4A and 4B, vending machine 200, by way of example, may be a vending machine for dispensing vended products. Display panel 114 may be adapted to display an image 140 representative of the vended products or other images to provide a dynamic visual experience to entice a customer to make a purchase.

Display panel 114 further comprises display panel front surface 130 and display panel back surface 128. LED projector 22 and lens 16 are mounted inside housing 112 and are adapted to project an image onto display panel back surface 128. The transparency of display panel 114 provides that the projected image may be seen from the display panel front surface 130.

Display panel back surface 128 may be coated with a rear projection screen material 54 to permit visualization of the image projected by lens 16. In accordance with an embodiment, rear projection screen material 54 may comprise a low gain matte neutral gray coating. It also is appreciated that other types of materials may be used. In general, whatever material may be used, it should be able to project the image yet block the components inside vending machine 200 from view. It also should not add color to the image where that would be undesirable.

In embodiments, media controller 280 may supply particular media from a plurality of stored media based on an input, such as, but not limited to, a signal from a motion sensor or touch sensor. In an embodiment, a visual experience may be triggered by the selection and purchase of a vended product made by a customer. A signal based on the activation of a vended product selection button may be communicated to media controller 280 and that signal may be used, at least in part, as criteria for which images are projected.

Referring again to FIGS. 4A and 4B, vending machine 200 may further comprise motion sensor 156. Motion sensor 156 may be operable to produce a signal based on sensing motion adjacent thereto. Motion sensor 156 may be in electrical communication with media controller 280. Media controller 280 may be operable to control projection of a particular image based at least in part on a signal from motion sensor 156. In another embodiment, a visual experience from the projected image may be triggered if a customer approaches housing 112 which activates motion sensor 156 so as to communicate a signal to media controller 280. Vending machine 200 may allow for a dynamic and interactive consumer experience that may be conducive to a satisfactory and entertaining transaction.

In accordance with particular embodiments, display panel 114 further comprises touch sensitive conductive layer 150 coupled to display panel front surface 130. Touch sensitive conductive layer 150 is electrically conductive. Touch sensitive conductive layer 150 may be operable to produce a signal based on a change in an electrical state that may occur if touched. In accordance with an embodiment, touch sensitive conductive layer 150 comprises indium tin oxide (ITO). Indium tin oxide may be substantially optically transparent to the visible spectrum, and colorless in thin layers. Thin films of indium tin oxide may be deposited on surfaces by electron beam evaporation, physical vapor deposition, and/or sputter deposition techniques, among others. ITO is known to be used to make transparent conductive coatings for liquid crystal displays, flat panel displays, plasma displays, touch panels, electronic ink applications, organic light-emitting diodes, among others.

In an embodiment, touch sensitive conductive layer 150 may be adapted to control dispensing of a vended product based on the particular image illuminating a particular portion of touch sensitive conductive layer 150. In an embodiment, vending machine 200 further comprises product dispenser 119. Product dispenser 119 may be operable to control dispensing of a particular vended product. Touch sensitive conductive layer 150 is in electrical communication with product dispenser 119. Product dispenser 119 may be operable to control dispensing of a particular vended product based at least in part on an electrical state of touch sensitive conductive layer 150.

In an embodiment, by way of example, static image 142 of available vended products may be rear projected onto touch sensitive conductive layer 150 such that if an image of a product is touched, touch sensitive conductive layer 150 produces a signal that is communicated to product dispenser 119 so as to affect the dispensing of a product based on that product image projected on that portion of touch sensitive conductive layer 150 touched by a customer.

In another embodiment, by way of example, the image projected onto touch sensitive conductive layer 150 may be dynamic and change displaying images of available products, prices, product information, and/or product use, and other information that may assist in affecting a transaction.

In another embodiment, a signal from touch sensitive conductive layer 150 may be communicated to media controller 280 so as to control, at least in part, which image may be projected. Images that are displayed may comprise static "buttons", video images, live television, streaming video, a sign, a bulletin board, a map, among others. Vending machine 200 may allow for a dynamic and interactive consumer experience that may be conducive to a satisfactory and entertaining transaction.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A projection system, comprising:
 a head-shaped figure including a face, the face comprising a translucent material, the face including a face back surface;
 an LED projector that is positioned within the head-shaped figure and has an illuminating source comprising one or more light emitting diodes; and
 a platform, wherein the head-shaped figure and the LED projector are coupled to the platform so as to maintain consistent alignment of the projector to the face back surface, the LED projector operable to project an image onto the face back surface.

2. The projection system of claim 1, further comprising:
 a lens adapted to couple to the LED projector such that an image may be projected from the LED projector through the lens, the LED projector and the lens being mounted inside the head-shaped figure operable to project an image onto the face back surface.

3. The projection system of claim 1, further comprising:

a media controller in communication with the LED projector; and a touch sensitive conductive layer coupled to the face, the touch sensitive conductive layer operable to produce a signal based on a change in an electrical state that may occur if touched, the touch sensitive conductive layer in electrical communication with the media controller, the media controller being operable to control projection of a particular image based at least in part on an electrical state of the touch sensitive conductive layer.

4. The projection system of claim 1, further comprising:

a projector mount operable to provide lateral side to side optical alignment, horizontal front to back optical adjustment, and vertical up and down optical alignment of the LED projector with respect to the face back surface.

5. A method comprising:

using a projection system to project an image onto a back surface of a rear projection screen having a shape of a face, the projection system comprising a head-shaped figure including the face, the face comprising a translucent material, the face including a face back surface, an LED projector having an illuminating source comprising one or more light emitting diodes, a wide angle fisheye lens adapted to couple to the LED projector such that an image may be projected from the LED projector through the wide angle fisheye lens, the LED projector and the wide angle fisheye lens being mounted inside the head-shaped figure operable to project an image onto the face back surface, and a platform, wherein the head-shaped figure and the LED projector are coupled to the platform so as to maintain consistent alignment of the LED projector to the face back surface; and providing a video signal to the LED projector.

6. The method of claim 5, wherein providing a video signal comprises:

filming a face of an actor so as to produce an image;

processing the image so as to conform the image to a size and shape of the face back surface; and converting the processed image to a video signal.

7. The method of claim 6, wherein filming the face of an actor comprises:

filming an actor's face using three cameras, a first camera located in front of the face so as to film the front of the face, a second camera located to the right of the face so as to film an oblique view of the right side of the face, a third camera located to the left of the face so as to film an oblique view of the left side of the face, wherein processing the image further comprises aligning, stabilizing, and merging the images from each of the three cameras together using image processing tools.

8. The method of claim 7, further including processing the image comprising:

creating a warp mesh;

distorting the image with the warp mesh so as to conform the image to the shape and size of the face back surface; and processing the image using the warp mesh so as to align features of the image of the face to corresponding features of the face back surface.

9. The vending machine of claim 4, wherein the panel and the LED projector are coupled in a manner so as to maintain consistent alignment of the projector to the panel back surface.

\* \* \* \* \*